United States Patent [19]

Huang

[11] Patent Number: 5,415,203

[45] Date of Patent: May 16, 1995

[54] PIPE HAVING TEMPERATURE DISPLAY CHIPS THAT CHANGE COLOR

[76] Inventor: L. S. Huang, 18, Alley 47, Lane 416, Chung Shan Rd. Sec. 2, Panchiao, Taipei, Taiwan, Prov. of China

[21] Appl. No.: 266,634

[22] Filed: Jun. 28, 1994

[51] Int. Cl.6 .............................................. F16L 55/00
[52] U.S. Cl. ..................................... 138/104; 138/103; 374/147
[58] Field of Search ............... 138/103, 104, 177, 178; 116/216, 228, 200; 73/292; 374/147, 148, 170

[56] References Cited

U.S. PATENT DOCUMENTS

| | | | |
|---|---|---|---|
| 2,099,126 | 11/1937 | Larsen | 138/104 |
| 2,181,035 | 11/1939 | White | 138/104 |
| 3,881,181 | 4/1975 | Khajezadeh | 374/147 |
| 4,743,120 | 5/1988 | Bowen | 374/147 |
| 4,773,767 | 9/1988 | Coll | 374/147 |
| 5,172,860 | 12/1992 | Yuch | 374/147 |
| 5,228,478 | 7/1993 | Kleisle | 138/104 |
| 5,265,959 | 11/1993 | Meltzer | 374/147 |
| 5,320,137 | 6/1994 | Huang | 374/147 |

Primary Examiner—James E. Bryant, III
Attorney, Agent, or Firm—Beveridge, DeGrandi, Weilacher & Young

[57] ABSTRACT

A pipe, which includes a plurality of transparent sections and a plurality of opaque sections alternatively connected in series, the opaque sections being made in multiple colors, the transparent sections having temperature display chips which change color when the inside temperature of the pipe is changed over a fixed range.

4 Claims, 4 Drawing Sheets

PIPE HAVING TEMPERATURE DISPLAY CHIPS THAT CHANGE COLOR

BACKGROUND OF THE INVENTION

The present invention relates to pipes, and relates more particularly to such a pipe which includes transparent sections spaced along the length for visually checking the inside.

Regular plastic and rubber pipes are commonly made in a single color and not transparent. Because regular plastic and rubber pipes are opaque, people cannot see the inside when a pipe is installed in a water piping system or an electric wiring system. In case there are uncommon things carried in a water pipe after its installation or if an electric wiring pipe is blocked by peculiar things during the wiring operation, the service quality or the job schedule will be affected. If the inside wall of an electric wiring pipe is burnt to release smoke due to an electric leakage, people cannot know the situation in time, and therefore a catastrophe may happen.

There are commercially available transparent plastic pipes, however these transparent plastic pipes are not colorful and have a limited application range. More particularly, regular transparent plastic pipes are weak in pressure and temperature resistance. Furthermore, regular water pipes cannot automatically show the temperature of the fluid delivered.

SUMMARY OF THE INVENTION

The present invention has been accomplished under the aforesaid circumstances. It is therefore an object of the present invention to provide a pipe which has means to automatically detect and show the temperature of the fluid delivered. It is another object of the present invention to provide a pipe which has transparent sections through which the inside of the pipe can be visually checked. It is still another object of the present invention to provide a pipe which is multiply colored and suitable for a variety of purposes including for making daily consumer goods and toys.

According to one embodiment of the present invention, the pipe comprises a plurality of transparent sections and a plurality of opaque sections alternatively connected in series, wherein the transparent sections are respectively adhered with temperature display chips, which change color when the inside temperature of the pipe is changed over a fixed range. According to another embodiment of the present invention, the temperature display chips are integrally molded within the transparent sections during the production of the pipe.

BRIEF DESCRIPTION OF THE DRAWINGS

The present invention will now be described by way of examples only with reference to the annexed drawings, in which.

DETAILED DESCRIPTION OF THE PREFERRED EMBODIMENT

Figure 1:
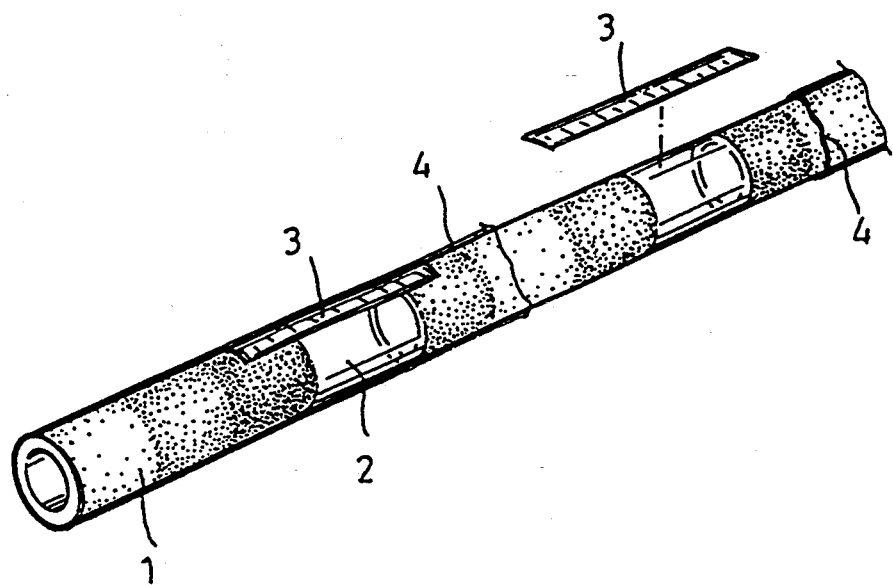
FIG. 1 is an exploded view of a pipe according to the present invention.
Figure 2:
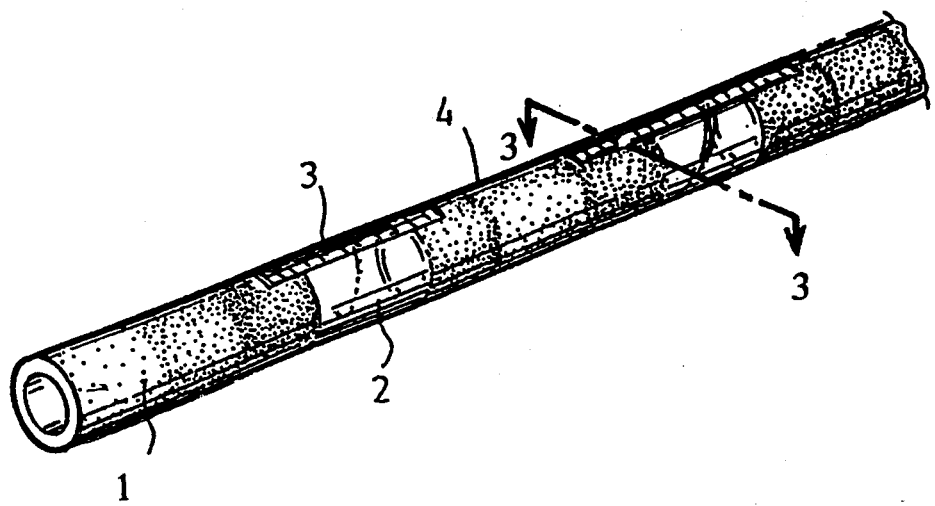
FIG. 2 is a perspective view of the pipe shown in FIG. 1.
Figure 3:
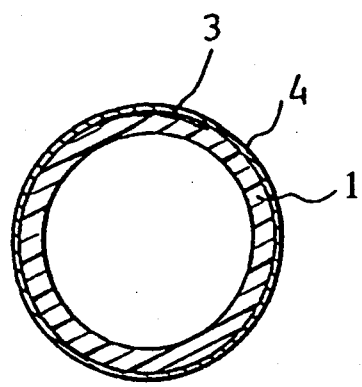
FIG. 3 is a cross section taken along line 3—3 of FIG. 2.

Referring to FIGS. 1, 2, and 3, a pipe is extruded from engineering plastics comprised of a plurality of opaque sections 1 and a plurality of transparent sections 2 alternatively connected in series. The opaque sections 1 are made in various colors. A liquid crystal temperature display chip 3 is respectively mounted on each transparent section 1 to detect and show the inside temperature of the pipe.

Figure 4:
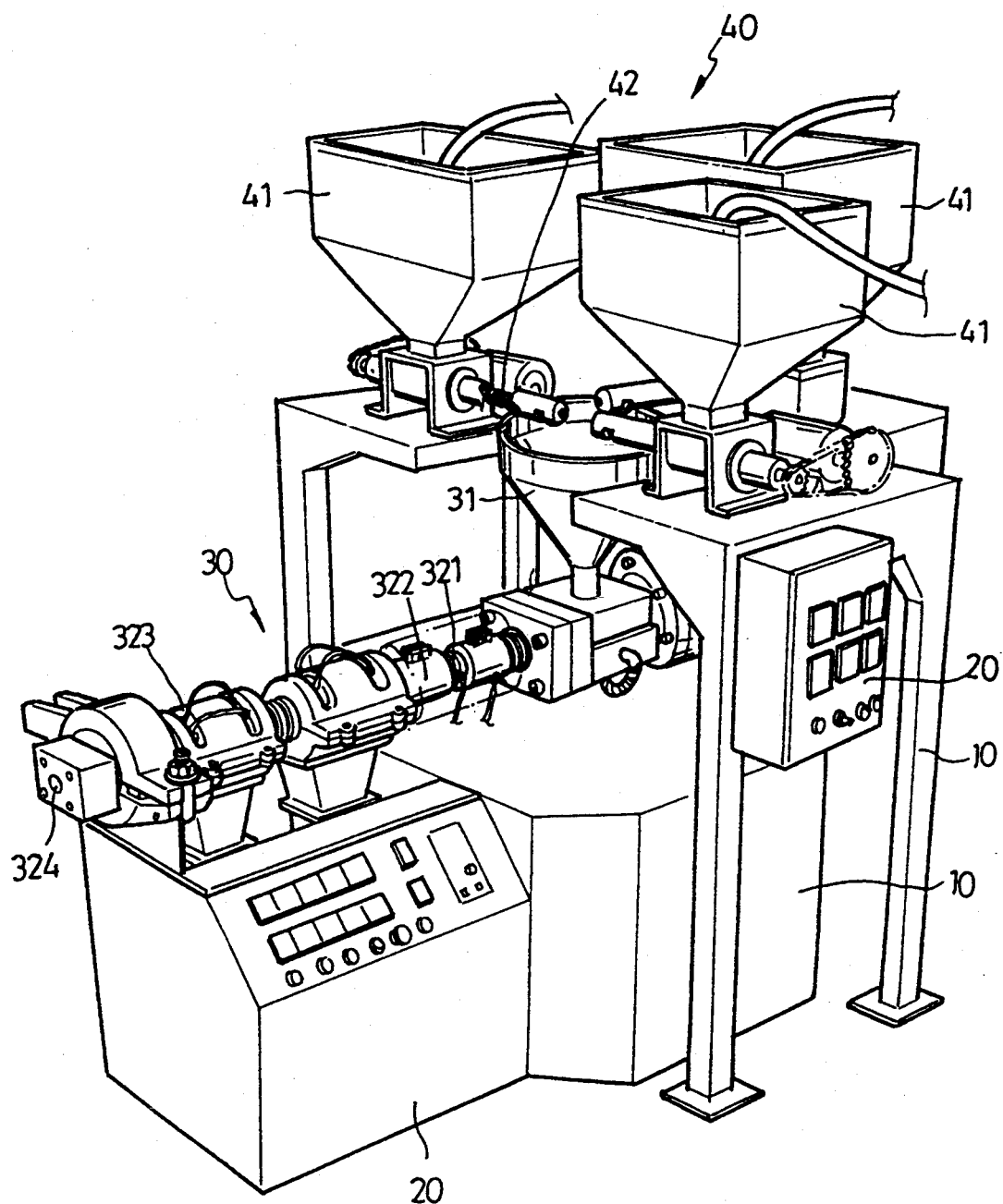
FIG. 4 shows the arrangement of a single-screw-rod extruding machine for making pipes in accordance with the present invention.
Figure 5:
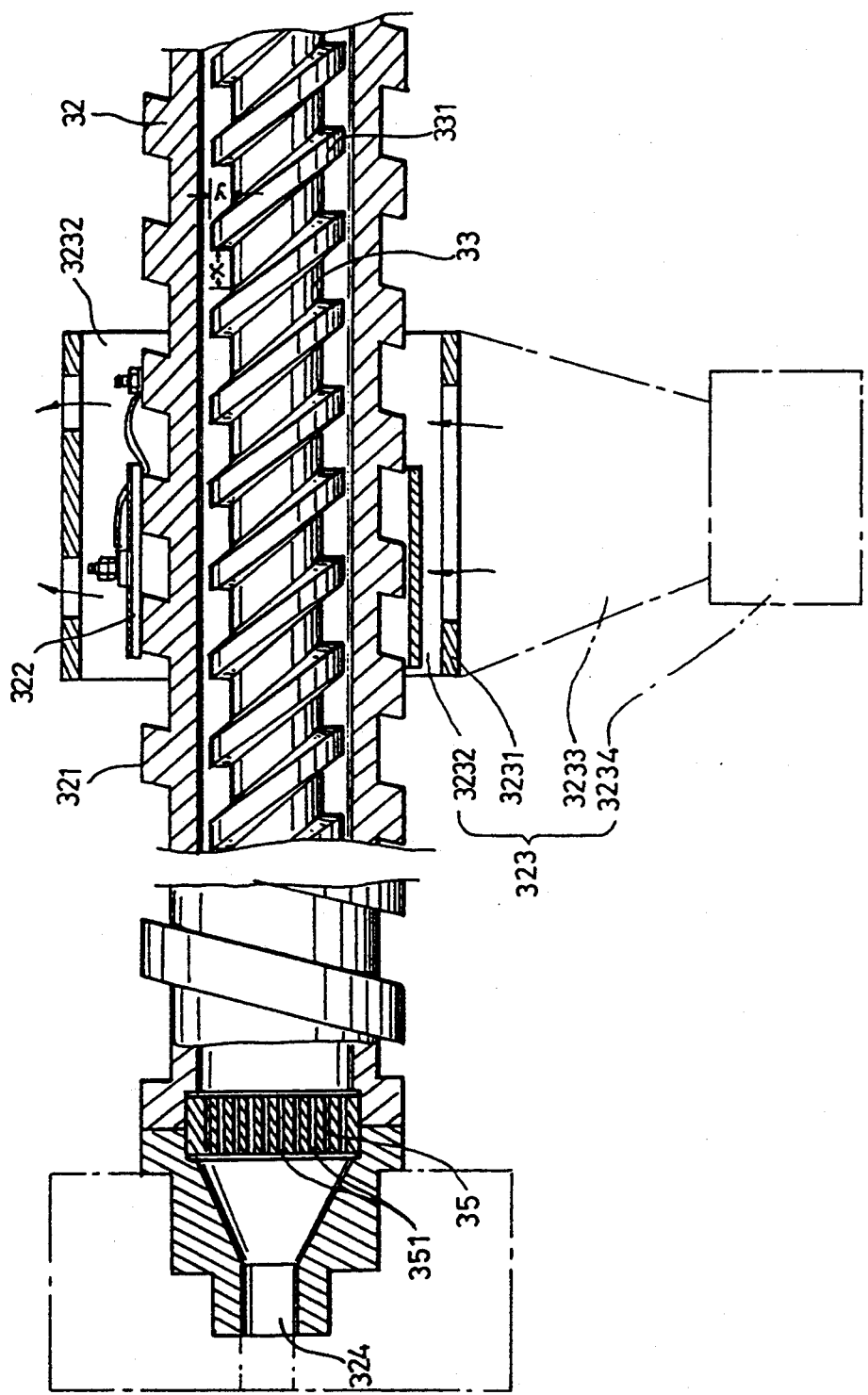
FIG. 5 is a longitudinal view in section of the extruding unit of the single-screw-rod extruding machine shown in FIG. 4.

Referring to FIGS. 4 and 5, therein illustrated shows a single-screw-rod extruding machine for making pipes in accordance with the present invention. The extruding machine comprises a machine base 10, a control system 20, an extruding unit 30, and a drying unit 40. The drying unit 40 comprises a plurality of drying drums 41 controlled by the control system 20 to deliver well-dried and metered plastic material to the feed port 31 of the extruding unit 30. The extruding unit 30 comprises an extruding tube 32 having an outside wall 321 which are threaded, a plurality of electric heaters 322 and a plurality of electric fans 323 respectively mounted around the outside wall 321 of the extruding tube 32 and arranged along the length. A screw rod 33 is longitudinally disposed inside the extruding tube 32. The pitch X and depth Y of the thread 331 of the screw rod 33 are equal so that the L/D ratio is 1:22 and the compression ratio is 1:1. There is a flow damping net 35 with flow guide holes 351 disposed within the extruding tube 32 between the output port 324 of the extruding tube 32 and the front end of the screw rod 33.

Referring to FIG. 5 again, the electric heaters 322 are fixedly mounted around the outside wall 321 of the extruding tube 32 and spaced along the length of the extruding tube 32. A plurality of coverings 3231 are respectively covered over the electric heaters 322. When installed, an air chamber 3232 is defined between each electric heater 322 and the respective covering 3231. The electric fans 323 each comprise blast fan 3234 and an air duct 3233 respectively connected to the extruding tube 32 and disposed in communication with either air chamber 3232. When operated, cooling air from either blast fan 3234 is distributed through the matched air chambers 3232 to even the temperature at the corresponding section of the extruding tube 32, and therefore plastic material can be evenly melted for extrusion.

During the operation of the extruding machine, plastic resins of different colors are respectively put in the drying drums 41 of the drying unit 40. By means of the control of the control system 20, plastic resins of different colors are respectively delivered from the drying drums 41 into the feed port 31 of the extruding unit 30 at different times and different quantities according to the predetermined settings. Fed-in plastic resins are moved forward by the screw rod 33. At the same time, the electric heaters 322 and the electric fans 323 are respectively controlled by the control system 20 to heat the plastic resins. As the plastic resins are completely melted, the molten plastics are propelled through the flow damping net 35 and then extruded out of the output port 324. Because of the arrangement of the flow damping net 35, the molten plastics do not flow back, and therefore a pipe having different colors at different sections can thus be obtained.

Referring to FIGS. 1 and 2 again, as indicated, the pipe has a plurality of transparent sections 2 spaced along the length. When the pipe is installed in a water piping system or an electric wiring system, the user or operator can check the inside of the pipe visually through the transparent sections 2. If the inside temperature of the pipe surpasses a predetermined value, the user or operator can quickly know the situation through the liquid crystal temperature display chips 3, and therefore necessary steps can be taken in time. The opaque sections 1 of the pipe can be made in any of a variety of colors or even in multiple colors as desired. Therefore, it is not necessary to paint the pipe when it is made.

Referring to FIG. 1 again, the liquid crystal temperature display chips 3 are respectively adhered to the transparent sections 2 of the pipe in the longitudinal direction and then covered with a respective transparent cover film 4 for protection. The cover films 4 prohibit the liquid crystal temperature display chips 3 from releasing toxic matter.

Alternatively, temperature sensitive liquid crystals may be directly mixed in the plastic resins (the plastic resins for making the transparent sections). When the pipe is finished and installed in a water supply system or an electric wiring system, the transparent sections will change in color when the inside temperature of the pipe is changed. Therefore, the present invention is suitable for use in delivering or carrying things which are not provided for eating or disposed in contact with foods.

As indicated, the present invention may be variously embodied. Recognizing that various modifications and changes are apparent, the scope herein shall be deemed as defined in the claims set hereinafter.

What is claimed is:

1. A pipe comprises a plurality of transparent sections and a plurality of opaque sections alternatively connected in series, said transparent sections comprising temperature display chips that change the color when the inside temperature of the pipe is changed over a fixed range.

2. The pipe of claim 1 wherein said opaque sections are respectively made in multiple colors.

3. The pipe of claim 1 wherein said temperature display chips are respectively adhered to said transparent sections and sealed by a respective transparent cover film.

4. The pipe of claim 1 wherein said temperature display chips are integrally molded within said transparent sections during production of the pipe.

* * * * *